United States Patent
Heshmati

(10) Patent No.: US 8,509,860 B2
(45) Date of Patent: Aug. 13, 2013

(54) METHOD AND APPARATUS FOR POWER EFFICIENT USER LOCATION PROFILE DETERMINATION IN MOBILE DEVICES

(76) Inventor: Ardalan Heshmati, Saratoga, CA (US)

( * ) Notice: Subject to any disclaimer, the term of this patent is extended or adjusted under 35 U.S.C. 154(b) by 0 days.

(21) Appl. No.: 13/269,547

(22) Filed: Oct. 7, 2011

(65) Prior Publication Data

US 2013/0090134 A1   Apr. 11, 2013

(51) Int. Cl.
  *H04M 1/00* (2006.01)
(52) U.S. Cl.
  USPC .......... 455/574; 455/550.1; 455/456.1; 455/456.6
(58) Field of Classification Search
  USPC .......... 455/574, 456.1, 550.1, 456.6
  See application file for complete search history.

(56) References Cited

U.S. PATENT DOCUMENTS

| | | | |
|---|---|---|---|
| 2010/0097494 A1* | 4/2010 | Gum et al. | 348/231.5 |
| 2012/0289244 A1* | 11/2012 | Goyal | 455/456.1 |
| 2012/0289252 A1* | 11/2012 | Hotes et al. | 455/456.1 |

* cited by examiner

*Primary Examiner* — Danh Le
(74) *Attorney, Agent, or Firm* — Tran & Associates

(57) ABSTRACT

Systems and methods are disclosed for reducing power consumption of a mobile device in determining locations by determining if the mobile device is stationary; and if the mobile device is stationary, determining if the mobile device is in a zone with a known location and assign the known location as the location of the mobile device without involving a position determination system in the mobile device to reduce power consumption arising therefrom.

20 Claims, 5 Drawing Sheets

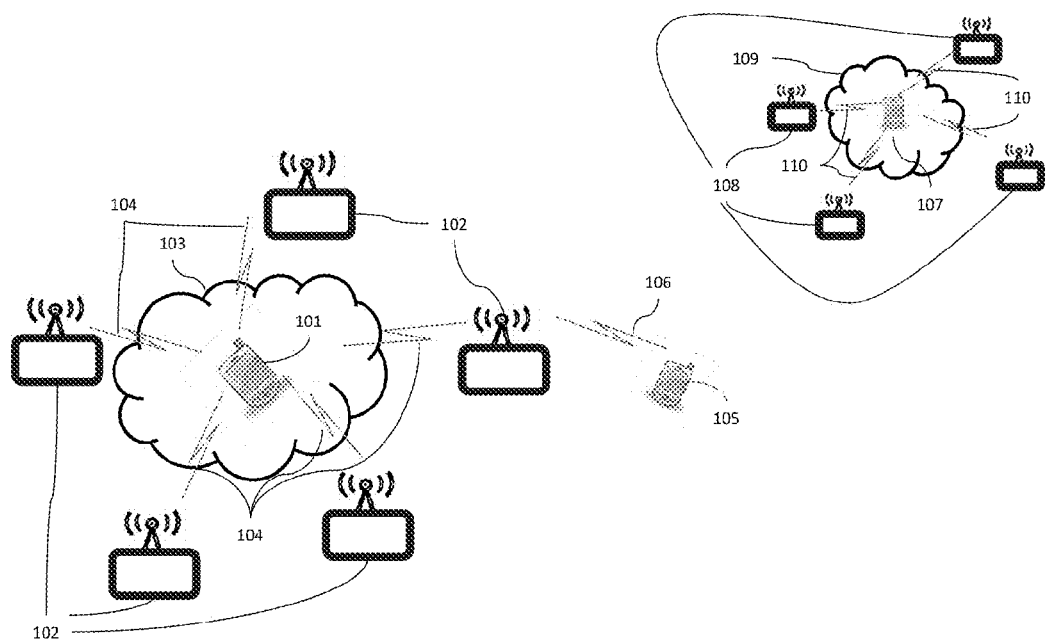
Fig 1. Unique signature from WiFi access points

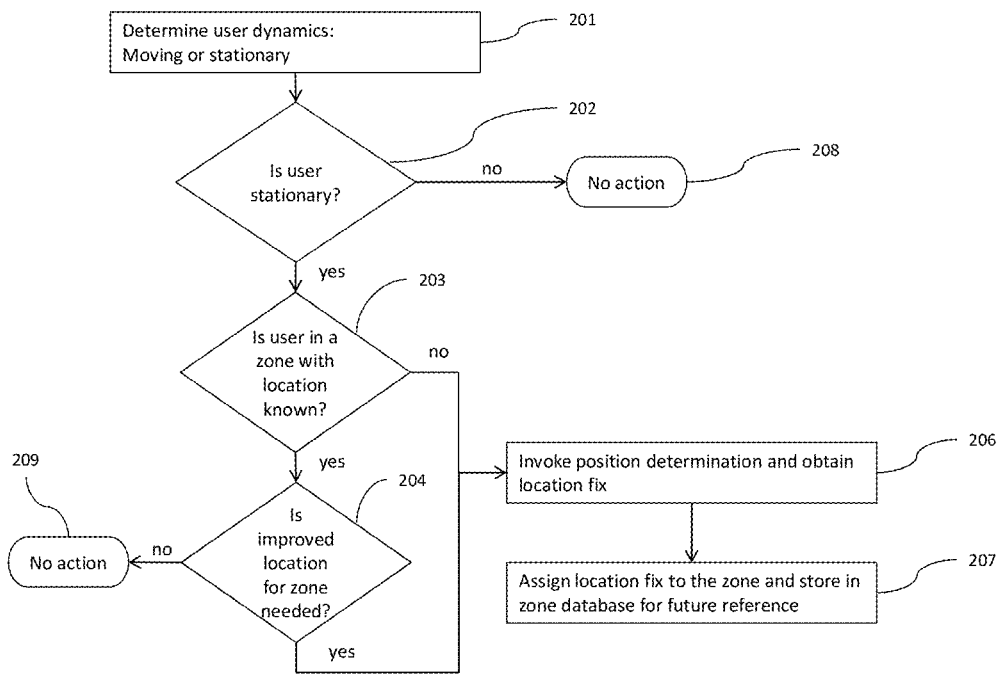
Fig-2 Minimize position fixes intelligently

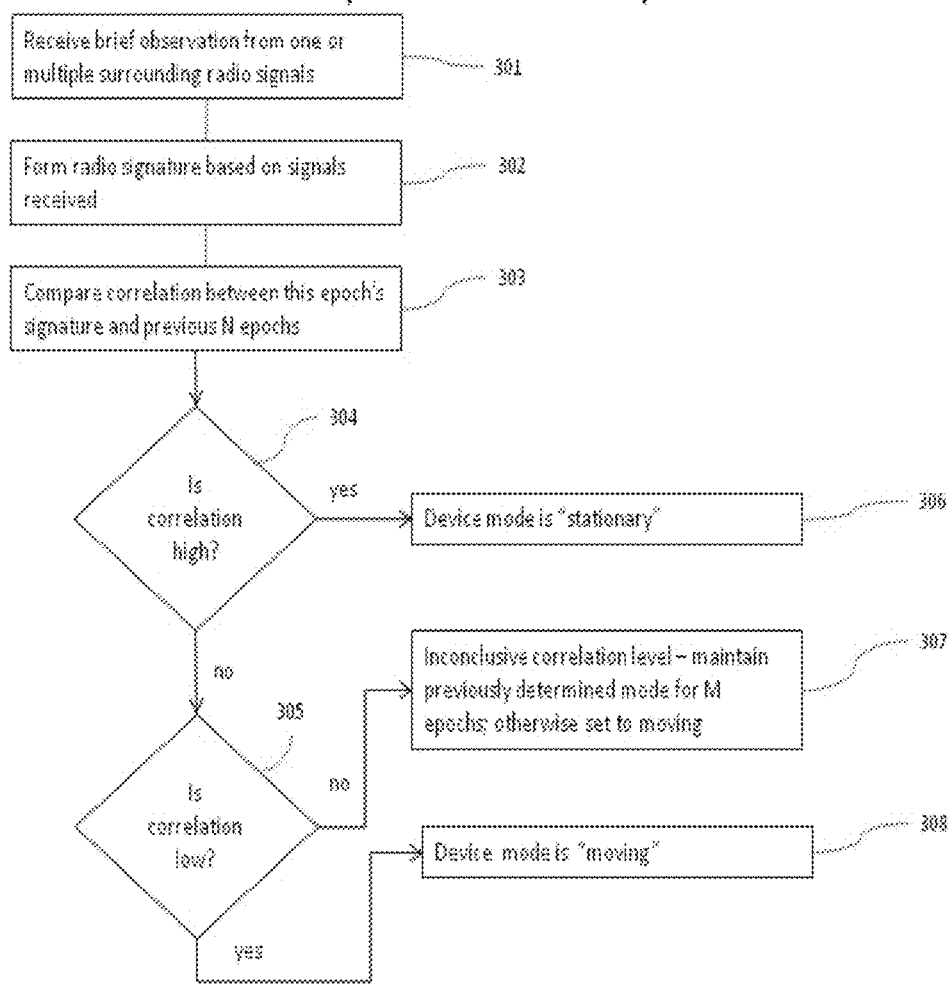

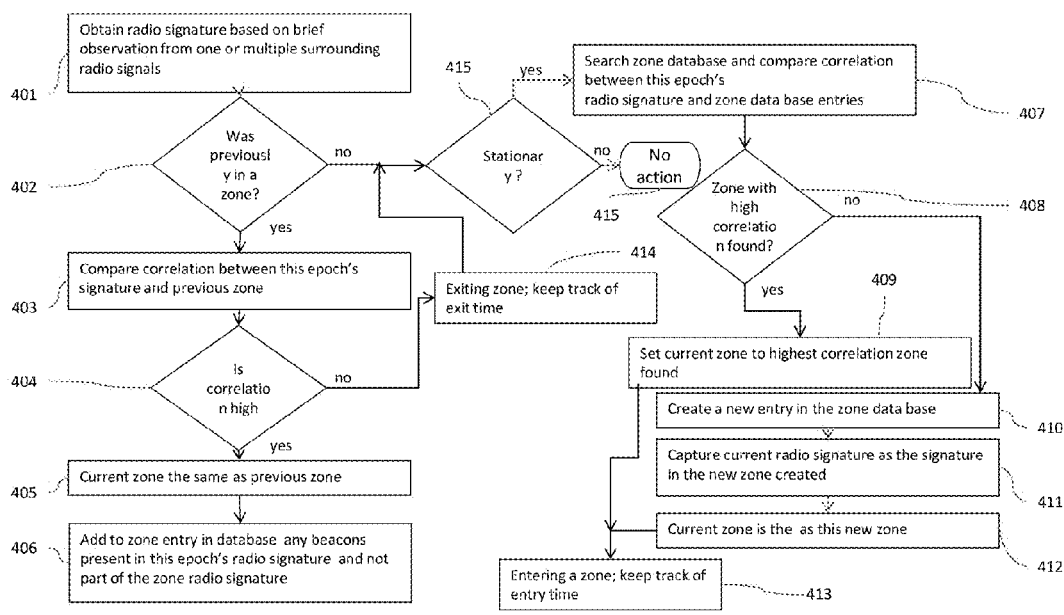
Fig-4 Determine if device is located within a zone using surrounding radio signature

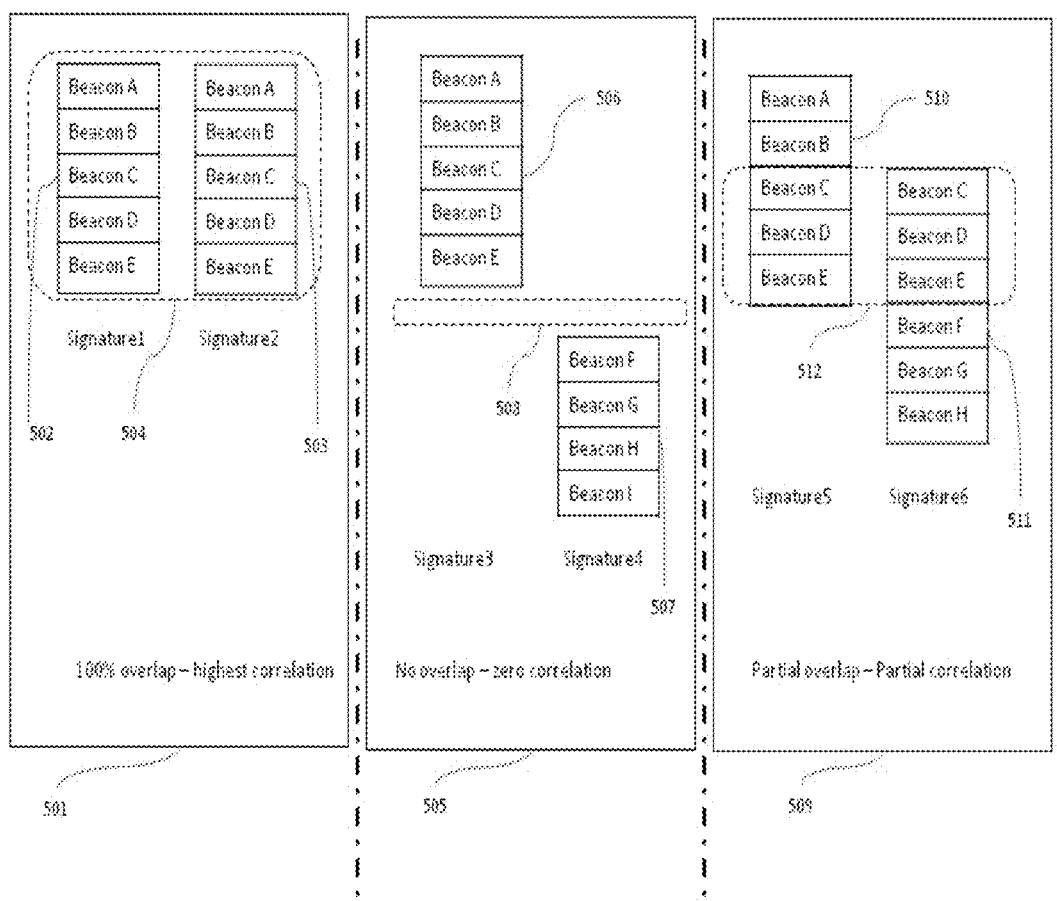

METHOD AND APPARATUS FOR POWER EFFICIENT USER LOCATION PROFILE DETERMINATION IN MOBILE DEVICES

BACKGROUND

The present invention pertains to a method and apparatus for power efficient user location profile determination in mobile devices.

Location Technologies such as Global Navigation Satellite Systems (GNSS), which includes GPS and GLONASS, as well as ground based systems such as those based on WIFI and cellular systems, are more and more available in mobile devices including feature phones and smart phones. The location functionality in these devices is enabling a wide range of applications sometimes referred to as location base services (LBS) or location enhanced applications. Most LBS concepts evolve around activities as a function of current/immediate location or manually entered address or location. These concepts have good utility in less familiar locale, mostly away from home. However, these LBS's have less utility in everyday life of most people who tend to have the same routines.

SUMMARY

Systems and methods are disclosed for reducing power consumption of a mobile device in determining locations by first determining if the mobile device is stationary; and if the mobile device is stationary, then determining if the mobile device is in a zone with a known location, and if the latter is true, assigning the known location as the location of the mobile device without involving a position determination system in the mobile device, thus reducing power consumption associated with the activation of such a system.

Implementations of the above aspect may include one or more of the following. The method includes updating a location associated with the zone. The method can turn on or activate a position determination system in the mobile device and obtain the location of the mobile device and update the location of the zone in a database. The determining of when the mobile device is stationary can include receiving an observation from one or more surrounding radio signals; forming a radio signature based on the received radio signals; correlating a current epoch signature with one or more prior epoch signatures; and indicating the mobile device is stationary when a high epoch signature correlation exists. A new zone location can be added to a database. A current radio signature can be used as the signature for the new zone location. The method can determine if a new radio beacon is present in an existing zone entry and adding an entry in a database to reflect newly located radio beacon. The method includes capturing zone entry and exit times to keep track of a total time spent in each zone, wherein the total time is used to rank and assign priority to zones by total time spend in each zone. A frequency of zone visit can be used to rank and assign priority to zones. The method includes reducing power consumption by reducing beacon observation rate when device is detected to be in a zone or increasing beacon observation rate based on when device is detected to be on the move to optimize zone detection response time for the next zone entry. The method includes reducing power consumption by reducing or increasing beacon observation rate base on an accelerometer output indicating movement since a last beacon observation. The zone location can be used to ensure locally relevant information for a user based on his or her location profile. A frequency of visit, a length of time spent in a predetermined zone, and a categorization of the zone can be used to prioritize search results based on proximity of search result locations to the zone. The method includes performing a web search based on an aggregate or a subset of a user's location profile which includes all the zones visited by the user. The web search parameters can include spending habit, locations frequented and time of travel between locations.

In another aspect, a mobile device includes a processor; a position determination system coupled to the processor, wherein the position determination system consumes power; means for determining if the mobile device is stationary; and means for determining if the mobile device is stationary and in a zone with a known location and if the latter is true assigning the known location as the location of the mobile device without involving the position determination system thus reducing power consumption associated with the activation of such a system.

In yet another aspect, a method for reducing power consumption of a mobile device in determining locations includes determining if the mobile device is stationary, including receiving an observation from one or more surrounding radio signals; forming a radio signature based on the received radio signals; correlating a current epoch signature with one or more prior epoch signatures; and indicating that the mobile device is stationary when a high epoch signature correlation exists. if the mobile device is stationary, the method determines if the mobile device is in a zone with a known location and assigns the known location as the location of the mobile device without involving a position determination system in the mobile device to reduce power consumption associated with the activation of such a system. The method then determines if a new radio beacon is present in an existing zone entry and adding an entry in a database to reflect newly detected radio beacon.

If mobile device is determined to be stationary, but not in a known zone, the method activates the positioning system in the mobile device, obtains the location of the mobile device and therefore location of the new zone. A new zone entry is created to capture its radio beacon signature and associated location.

In one embodiment, if the mobile device is moving, the method activates the positioning system in the mobile device periodically and obtains the location of the mobile device to determine path of travel between zones.

The method can include capturing zone entry and exit times to keep track of a total time spent in each zone, wherein the total time is used to rank and assign priority to zones by total time spend in each zone.

Advantages of the preferred embodiments may include one or more of the following. The system supports location based applications with a low power consumption, yet achieving accurate knowledge of the user location profile. Location profile can effectively be determined at minimal to no additional hardware cost to the mobile device and minimal power consumption which, in the preferred embodiment, is done by intelligently harvesting the location profile. The system thus delivers location profile at minimal power consumption by avoiding frequent invocation of position determination functions and in fact only minimally invoking them. In contrast, conventional methods would require periodically invoking the position determination function available in the mobile device (such as GPS, or those based on WiFi and cellular systems) and using the produced location fix at these intervals for the purpose of location profile determination. This operation would consume significant amount of precious available mobile device battery life and as such reduces usage convenience associated with location based services.

Other advantages of the preferred embodiments may include one or more of the following. The system utilizes the location profile of the mobile device user in his/her day to day life to enhance user experience in multitude of location based or location enhanced. It delivers the user location profile at low power consumption, without requiring additional hardware, and by intelligent use of hardware and technologies generally readily available in mobile devices today.

Various aspects and embodiments of the invention are described in further detail below.

BRIEF DESCRIPTION

The present invention described herein will become apparent from the following detailed description considered in connection with the accompanying drawings, which disclose several embodiments of the invention. It should be understood, however, that the drawings are designed for the purpose of illustration and not as limits of the invention.

FIG. 1 shows an exemplary unique signature from WiFi access points.

FIG. 2 shows one embodiment for minimizing position fixes intelligently.

FIG. 3 shows one embodiment for determining if a device is stationary at low impact to power consumption.

FIG. 4 shows one embodiment for determining if device is located within a zone using surrounding radio signature.

FIG. 5 shows an exemplary operation of a correlation function.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

FIG. 1 shows an exemplary unique signature from WiFi access points. An exemplary signature consists of a set of unique identifiers present within a set of signals received in a given local area. In FIG. 1, a method uniquely associates signals received from one or more WiFi access points to a particular zone. In this figure, a mobile device (101) is scanning its surroundings and is able to receive signals (104) from the 5 WiFi access points (102) nearby. Each access point identifies itself with a unique identifier as part of its transmission. These access points can be received by the mobile device in a zone (103). The combination of these unique identifiers is unique to zone (103) and forms the WiFi access point signature for that zone. It can be used to uniquely identify if a mobile device is placed within this zone if the mobile device is receiving same or substantially the same signature as the one associated with the zone.

People in everyday life tend to frequent many of the same locations. This includes significant time spent in frequently visited primary zones of interest such as home, work-place, or school, among others. Other locations are frequented but less regularly. For example, these locations can be secondary zones of Interest such as supermarket, mall, movie theaters, gas stations, local eateries, etc. Primary commute pattern can be determined by repetitive observation of movement between zones. The tendency to commute between primary zones at generally the same time-of-day may be used as predictor of future behavior and can be used to obtain content of interest along the commute corridors.

Reception of the same signature over multiple consecutive scans by the mobile device may be used to indicate the device is pseudo-stationary and confined to the same local proximity, where signals from the same set of beacons may be heard.

In FIG. 1, mobile device (105) is only receiving signal from one of the WiFi access points associated with zone (103), and as such has a substantially different signature from zone (103) and therefore is determined to be outside that zone. It is, however, also determined that the user is near zone (103). In one embodiment, this information may be sufficient to initiate certain action.

The bounded area (109) is a different zone from (103) where a mobile device (107) is receiving signals (110) including the unique identifiers from the surrounding 4 access points (108), different from (102). The combination of the unique identifiers from this set of access points and the region over which their signals can be heard uniquely identifies zone (109) as unambiguously different from zone (103)

Zone information may be used to customize user interaction with the handset. For example a student's phone ringer may be muted as he/she enters school campus and re-enabled as he/she leaves. Similarly a computer's home screen can show one set of applications when in a home zone and another in a work zone. In another example, the zone information can be used to ring a cell phone for certain incoming calls in a given zone while letting other calls go to voicemail when in a different zone such as a conference zone, among others.

Zone knowledge is used to ensure locally relevant information for the user based on his location profile. This includes:

Searching large information databases including those local to the device, server based, or on the World-Wide-Web for information relevant to the aggregate of the user's location profile as opposed to searches centered on a single location. A computer program, referred to, as search engine is used to perform this function. Information founds as a result of search engine execution is referred to as search results.

Frequency of visit and/or length of time spend in zones in the location profile as well as categorization of the zones may optionally be used to further prioritize search results based on proximity of the search results to locations to the zones.

Targeted advertising for businesses and activities around the user's location profile. This may be combined with other information known about the user including spending habit, user's age, etc. Locations frequented and time of travel between locations can help classify a person and its lifestyle.

Early traffic alarms on frequent routes of travel or general location profile. This may include but not limited to accidents, road condition alerts, speed cameras, speed radars.

Local social networking—bring people together with common interests and overlapping or close by location profiles.

All these applications are significantly enhanced with knowledge of the user location profile. Location profile can only be made available if it can effectively be determined at minimal to no additional hardware cost to the mobile device and minimal power consumption which, in the preferred embodiment, is done by intelligently harvesting the location profile. The system thus delivers location profile at minimal power consumption by avoiding frequent invocation of position determination functions and in fact only minimally invoking them. Position determination system is a system available in the mobile device (such as GPS, or those based on WiFi and cellular systems) that determines geographic latitude and longitude of the mobile device. In contrast, conventional methods would require invoking the position determination system available in the mobile device at periodic intervals and using the produced position fix at these intervals for the purpose of location profile determination. This operation would consume significant amount of precious available mobile device battery life and as such can be prohibitively expensive in battery life. It should also be noted that the process of scanning surrounding area for radio signals and receiving unique identifiers from such signals is significantly easier and lower in power consumption than fully communicating within a system such as WiFi and/or cellular. It is also significantly easier and lower in power consumption than the position determination system.

The approach described in FIG. 1 is not limited to use with WiFi. In another embodiment, the system may use other radio systems where broadcast points transmit unique identifiers, including cellular. In another embodiment, combination of reception from different radio systems, for example WiFi and cellular, may be used as radio signature.

FIG. 2 shows one approach for minimizing position fixes intelligently. Power efficiency is critical to efficient implementation of location profiling in mobile devices. The act of performing a position fix using position determination technologies, including but not limited to, those using GNSS, WiFi, cellular, consumes significant amount of power and as such can be prohibitive to perform continuously. Therefore an intelligent harvesting of position fixes is herein devised. It is first determined if the user is moving or stationary (201). For the purpose of determining key zones of interest to a user, it is only necessary to consider positioning him if stationary (202). If the user is in a zone, for which location is already known (203), the system will consider if improved location for that zone is needed (204). In one embodiment, this may be done by keeping track of the position uncertainly of any given zone and deciding to attempt to improve on the position fix if uncertainly is larger than a given threshold. In another embodiment, the need for improved location could also be a function of time since last position fix for that zone.

If the system determines that a new location fix is required, the system invokes one or more position determination technology available in the mobile device and obtains the best position fix and associated position uncertainty available (206). This position fix is assigned to the zone and stored in the zone data base for future reference (207).

FIG. 3 is a flow diagram of a method for determining if a device is stationary with minimal power consumption requirements. The system performs periodic brief observations of one or multiple surrounding radio signal types (301). This includes but not limited to WiFi and cellular. These uniquely identifiable radio broadcast point are hereafter referred to as beacons. In one embodiment, these beacons are deployed as part of a communication system and not necessarily part of the position determination system. In another embodiment, the system may be deployed or augmented with beacons specifically deployed for this purpose. The radio range of underlying technologies used for beacons determines the size of the zone it can help monitor. The combination of received beacons at a given observation epoch forms the radio signature at that time and referred to as the epoch signature (302) for that epoch. In one embodiment, the signal characteristics such as signal to noise ratio (SNR) of each beacon may also be used as part of the signature.

The radio signature is unique to a given area and comparison of consecutive radio signature observations is used as determinant of a device being on the move or being generally stationary. The radio signature of one epoch is compared to radio signatures from last N epochs and correlation is calculated (303). If correlation exceeds high threshold (304), then the device is determined to be generally stationary (306). If correlation is lower than the low threshold (305), then it's determined to be moving (308). if the correlation falls between high and low threshold, then this epoch is inconclusive (307). In one embodiment, the movement status previously determined is maintained until next epoch when a new signature is obtained and analyzed.

FIG. 4 is a flow diagram of a method for determining if the mobile device is located within a zone using the surrounding radio signature. The radio signature based on observation of the surrounding beacons is obtained (401) and used to identify zone the device is in. Given the unique identifiers of the beacons, the radio signature of each zone is unique to the general proximity of that zone. The area attributed to the zone is a function of radio range of beacons used. In one embodiment, other additional signal attribute such as SNR can additionally be used as part of the signature and can help further reduce the footprint of a zone.

If the device was previously in a zone (402), its signature is compared to the signature of the zone it was previously in (403). If correlation is high, the device must be in the same zone as was in previously (405). In this case, any additional beacons present in this epoch's radio signature and not in the zone signature, are added to the signature for that zone and the zone data base updated for future reference (406). If correlation is not high, then device is no longer in the zone it was in previously. it is said to have exited the zone and the time of exit is captured and stored (414).

If the device was not previously in a known zone (402) or it was determined that device had exited the zone it was previously in (414), then if it's deemed to be stationary (415), the zone database is searched for a zone whose beacon radio signature has high correlation with this epoch's beacon radio signature (407). If a high correlation zone is found (408), then the current zone for the device is said to be in that zone (409) and time of zone entry is captured and stored (413). By deduction, the device is located at the location determined for the zone it's determined to be in. Otherwise, the data base does not contain an entry whose beacon radio signature matches this epoch's beacon radio signature. Device must be in a new zone. A new zone entry is created in the zone data base and a unique zone id is assigned (410). This epoch's beacon radio signature is assigned as the new zone's beacon radio signature (411). The device is said to be in this newly created zone and identified by the unique zone id (412). The system also captures the entry to a new zone and captures and stores time of entry to the zone (413).

In one embodiment, zone entry and exit times as captured in (413) and (414) may be used to keep track of total time spend in each zone which in turn may be used to rank and assign priority to zones by total time spend in each zone. In another embodiment, frequency of zone visits may be used to rank and assign priority to zones.

In another embodiment, repetitive order and/or time of zone visits is used to predict future zone visit behavior. In one embodiment, the beacon observation rate may optionally be optimized for power by slowing down the rate or by speeding up the observation interval to expedite zone detection response time.

In another embodiment, the beacon observation rate may be optimized for power and adjusted utilizing low power accelerometer, the output of which is integrated and used to determine if there has been significant enough movement since last beacon observation. This would be a coarse determination that the device may have moved sufficiently enough to justify another beacon observation, or otherwise determines that the device is in the same general location since last beacon observation and therefore no new beacon observation is necessary.

FIG. 5 compares different beacon signature samples and correlates the location where those samples are taken. In each example, two signatures are compared. In (501), signature 1 is represented by a table of beacons (502). Signature 2 is similarly represented by a table of beacons (503). These signatures may have been taken by one or multiple devices at the same time or at different times. In these tables, each entry represents a beacon where each beacon is designated by a letter representing a unique beacon with a unique ID. The two tables are compared against one another and the overlap (504) is measured. This example represents a perfect match with every entry in signature 1 (502) having a correspondingly matching entry in Signature 2 (503). The perfect match indicates that the two signature samples reflect same location where all the same beacons can be heard.

Block (505) compares signatures 3 (506) and signature 4 (507), constructed as described above. The two tables are compared against one another and the overlap (508) is measured. As illustrated by (508), there is no overlap and no common entry between these two signature tables and therefore there is zero correlation between them, indicating that the two samples have been taken at different locations.

Block (509) compares signatures 5 (510) and signature 6 (510), constructed as described above. The two tables are compares against one another and the overlap (512) is measured. In this case there is partial overlap measured at 3 matches and 5 mismatches (2 in signature 5 and 3 in signature 6). These two samples are therefore taken at locations close enough to one another to receive some of the same beacons yet far enough from one another to receive beacons unique to only their location. In another embodiment, the correlation may be measured as a ratio or another function using overlap (509) and sample size of one or both of the signatures (510) and (511). Depending on the applications, different correlation thresholds may be used as a trigger to declare same or different locations in these cases.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments. Thus, the present invention is not intended to be limited to the embodiments shown herein but is to be accorded the widest scope consistent with the principles and novel features disclosed herein.

What is claimed is:

1. A method for reducing power consumption of a mobile device in determining locations with a position determination system having an active mode where the position determination system has an activated mode that generates position data and a deactivated mode where the position determination system operates with minimal power consumption, comprising:
   a. determining once in advance a known location for a predetermined zone and storing said zone and location in a data storage device;
   b. determining if the mobile device is stationary; and
   c. if the mobile device is stationary, determining if the mobile device is in said predetermined zone with said known location and assigning the known location as the location of the mobile device and placing the position determination system in the deactivated mode to minimize power consumption arising from operating said position determination system.

2. The method of claim 1, comprising updating a location associated with the zone.

3. The method of claim 2, comprising performing the operations of claim 1, and subsequently turning on a position determination system in the mobile device and obtaining the location of the mobile device and updating the location of the zone in a database to obtain more accurate location fix for the zone.

4. The method of claim 1, comprising adding a new zone to a database.

5. The method of claim 4, comprising using a current radio signature as the signature for the new zone.

6. The method of claim 4, comprising invoking position determination system to produce location for the new zone.

7. The method of claim 1, comprising determining if a new radio beacon is present in an existing zone entry and adding an entry in a database to reflect newly detected radio beacon while in the existing zone.

8. The method of claim 1, comprising capturing zone entry and exit times to keep track of a total time spent in each zone, wherein the total time is used to rank and assign priority to zones by total time spend in each zone.

9. The method of claim 1, comprising using a frequency of zone visit to rank and assign priority to zones.

10. The method of claim 1, comprising reducing power consumption by reducing beacon observation rate when device is detected to be in a zone or increasing beacon observation rate when device is detected to be on the move to optimize zone detection response time for the next zone entry.

11. The method of claim 1, comprising reducing power consumption by reducing or increasing beacon observation rate base on an accelerometer output indicating movement since a last beacon observation.

12. The method of claim 1, wherein the zone location is used to ensure locally relevant information for a user.

13. The method of claim 1, wherein the user location profile consisting of the aggregate of the zone locations visited by the user is used to ensure locally relevant information for a user.

14. The method of claim 1, comprising using a frequency of visit, a length of time spent in a predetermined zone, and a categorization of the zone to prioritize search results in a database based on proximity of search result locations to the zone.

15. The method of claim 14, wherein the database is coupled to the Internet to provide a web search engine and wherein web search parameters comprise spending habit, locations frequented and time of travel between locations.

16. The method of claim 1, comprising performing a web search based on an aggregate of a user's location profile.

17. A method for reducing power consumption of a mobile device in determining locations, comprising:
   a. determining if the mobile device is stationary; and
   b. if the mobile device is stationary, determining if the mobile device is in a zone with a known location and assigning the known location as the location of the mobile device without activating a position determination system in the mobile device to reduce power consumption arising from said activation, wherein the determining if the mobile device is stationary comprises:
   c. receiving an observation from one or more surrounding radio signals;
   d. forming a radio signature based on the received radio signals;
   e. correlating a current epoch signature with one or more prior epoch signatures; and
   f. indicating the mobile device is stationary when a high epoch signature correlation exists.

18. A mobile device, comprising:
   a. a processor;
   b. a position determination system coupled to the processor, wherein the position determination system has an active mode that generates position data and consumes power and a passive mode that minimizes power consumption;
   c. means for determining once in advance a known location for a predetermined zone and storing said zone and location in a data storage device;

d. means for determining if the mobile device is stationary; and e. means for determining if the mobile device is stationary and in said zone with said known location, wherein the known location is assigned to the location of the mobile device while keeping the position determination system in the deactivated mode to reduce power consumption.

19. The device of claim 18, comprising a search engine coupled to the processor, wherein the search engine receives a frequency of visit, a length of time spent in a predetermined zone, and a categorization of the zone to prioritize search results based on proximity of search result locations to the zone.

20. The device of claim 18, comprising an accelerometer coupled to the processor and means for indicating movement since a last radio beacon observation.

* * * * *